United States Patent Office 3,232,965
Patented Feb. 1, 1966

3,232,965
6-CHLORO-Δ$^{1,4,6}$-PREGNATRIENE-17α,21-DIOL-3,20-DIONES
Howard J. Ringold and George Rosenkranz, Mexico City, Mexico, assignors, by mesne assignments, to Syntex Corporation, a corporation of Panama
No Drawing. Filed June 20, 1958, Ser. No. 743,466
35 Claims. (Cl. 260—397.45)

The present invention relates to novel cyclopentanophenanthrene derivatives and to a process for the production thereof.

More particularly the present invention relates to novel 6 - chloro-Δ$^{1,4,6}$-pregnatrien-17α,21-diol-3,20-dione derivatives having an oxygen function at C–11, i.e. 11β-hydroxy or 11-keto, the 21-mono hydrocarbon carboxylic acid esters of less than 12 carbon atoms of these derivatives, and the same compounds having in addition a 9α-halo selected from the group consisting of fluorine, bromine or chlorine. The present invention also relates to the corresponding Δ$^{4,6}$-dien derivatives which are intermediates for the preparation of the final compounds. Both the final triene compounds and the intermediate diene compounds are cortical hormones having a cortisone like (anti-inflammatory) action with a minimum of salt retention effect. The compounds of the present invention cause deposition of glycogen in the liver of mammals but unlike other gluco-corticoids do not exhibit sodium retention effects.

In U.S. patent application Serial No. 670,366, filed July 8, 1957, now abandoned there has been disclosed the novel cortical hormones 6α-chloro-Δ$^4$-pregnen-17α,21-diol-3,11,20-trione and its 21-esters and 6α-chloro-Δ$^{1,4}$-pregnadien-17α,21-diol-3,11,20-trione and its 21-esters. The same compounds having an 11β-hydroxy group rather than an 11-keto group are disclosed in U.S. patent application Serial No. 670,368, filed July 8, 1957, now abandoned. In U.S. patent application Serial No. 741,753, filed June 13, 1958, now abandoned, the same 6α-chloro derivatives having in addition a 9α-halo group are disclosed.

In accordance with the present invention it has been discovered that dehydrogenation of the aforementioned 6α-chloro-Δ$^4$ and Δ$^{1,4}$ derivatives with chloranil in n-amyl alcohol solution produces the corresponding 6-chloro-Δ$^{1,4,6}$-compounds. Dehydrogenation of the 6α-chloro-Δ$^4$-derivatives with chloranil in xylene produced 6-chloro-Δ$^{4,6}$-derivatives which may be further dehydrogenated to 6-chloro-Δ$^{1,4,6}$-compounds with selenium dioxide with selenium dioxide in t-butanol or chloranil in n-amyl alcohol.

The novel cortical hormones of the present invention may be illustrated by the following formula:

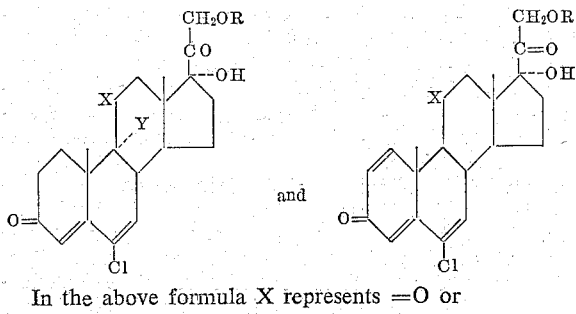

and

In the above formula X represents =O or

Y represents hydrogen or a halo selected from the group consisting of fluoro, chloro and bromo. R represents hydrogen or a hydrocarbon carboxylic acid ester group of less than 12 carbon atoms of a type known in the steroid art. These ester groups may be for example saturated or unsaturated, straight or branched chain aliphatic, cyclic or cyclic-aliphatic and may be conventionally substituted as with methoxy or halogen. Typical ester groups are acetate, propionate, butyrate, hemisuccinate, caproate, benzoate, trimethylacetate, cyclopentylpropionate, phenoxypropionate and β-chloropropionate.

The process for the production of the novel compounds set forth above may be illustrated by the following equation:

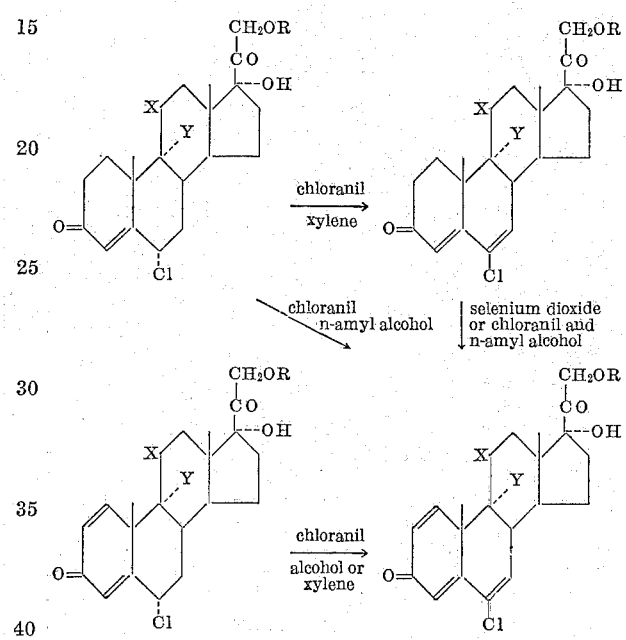

In the above equation X, Y and R represent the same groups as heretofore set forth.

In practicing the process above outlined, preferably the starting material is a lower aliphatic acid ester such as the 21-acetate of 6α-chloro hydrocortisone, cortisone, prednisone or prednisolone. In the case of the 21-acetate of 6α-chloro-hydrocortisone or cortisone, as indicated, refluxing with chloranil and amyl alcohol for about 1 day gave, after conventional separation and purification, the 21-acetate of 6-chloro-Δ$^{1,4,6}$-pregnatriene-11β,17α,21-triol-3,20-dione and the 21-acetate of 6-chloro-Δ$^{1,4,6}$-pregnatriene-17α,21-diol-3,11,20-trione respectively. When the same starting materials were refluxed with chloranil and xylene the corresponding 21-acetate of Δ$^{4,6}$-pregnadiene-11β,17α,21-triol-3,20-dione and Δ$^{4,6}$-pregnadiene-17α,21-diol-3,11,20-trione were prepared. Refluxing the corresponding 1-dehydro compounds with chloranil in the presence of either n-amyl alcohol or xylene produced dehydration at C–6, C–7 so that the Δ$^{1,4,6}$-derivatives resulted. As previously set forth the Δ$^{4,6}$ compounds upon treatment with selenium dioxide gave the corresponding Δ$^{1,4,6}$ derivatives as did treatment with chloranil in n-amyl alcohol.

The 21-acetates thus produced upon conventional saponification preferably with sodium methoxide in methanol gave the corresponding 21-alcohols. Conventional esterification with corresponding acid anhydrides or halides in pyridine gave the 21-mono esters previously described.

The following specific examples serve to illustrate but are not intended to limit the present invention.

Example I

A mixture of 5 g. of the 21-acetate of 6α-chloro-hydrocortisone, 7 g. of chloranil and 100 cc. of n-amyl alcohol was refluxed for 16 hours, cooled and diluted with ether. The solution was successively washed with water, 5% sodium carbonate solution and water, dried over anhydrous sodium sulfate, filtered and evaporated to dryness under reduced pressure. Chromatographic purification of the residue yielded the 21-acetate of 6-chloro-$\Delta^{1,4,6}$-pregnatriene-11β,17α,21-triol-3,20-dione.

Similarly, the 21-acetate of 6α-chloro-cortisone was converted into the 21-acetate of 6-chloro-$\Delta^{1,4,6}$-pregnatriene-17α,21-diol-3-,11,20-trione.

Example II

A mixture of 5 g. of the 21-acetate of 6α-chlorohydrocortisone, 4 g. of chloranil and 100 cc. of xylene was refluxed for 12 hours and then the reaction product was worked up as described in the previous example, thus giving the 21-acetate of 6-chloro-$\Delta^{4,6}$-pregnadiene-11β,17α,21-triol-3,20-dione.

Similarly, the 21-acetate of 6α-chloro-cortisone was converted into the 21-acetate of 6-chloro-$\Delta^{4,6}$-pregnadiene-17α, 21-diol-3,11,20-trione.

1 g. of the 21-actate of 6-chloro-$\Delta^{4,6}$-pregnadiene-11β,17α,21-triol-3,20-dione was mixed with 50 cc. of anhydrous t-butanol, 300 mg. of selenium dioxide and 0.1 cc. of pyridine and the mixture was refluxed for 70 hours under an atmosphere of nitrogen, cooled and diluted with ethyl acetate. The mixture was filtered through celite and the residue was washed with ethyl acetate. The combined filtrate and washings was evaporated to dryness under reduced pressure and the residue was triturated with water. The precipitate was collected, dried and purified by chromatography. There was thus obtained the 21-acetate of 6-chloro-$\Delta^{1,4,6}$-pregnatriene-11β,17α,21-triol-3,20-dione, identical to the compound obtained in accordance with the previous example.

Similarly, the treatment of the 21-acetate of 6-chloro-$\Delta^{4,6}$-pregnadiene-17α,21-diol-3,11,20-trione with selenium dioxide afforded the 21-acetate of 6-chloro-$\Delta^{1,4,6}$-pregnatriene-17α,21-diol-3,11,20-trione, identical to the compound obtained in accordance with the previous example.

Example III 1 g. of the 21-acetate of 6-chloro-$\Delta^{4,6}$-pregnadiene-11β, 17α, 21-triol-3,20-dione, obtained as described in the first paragraph of the previous example, was treated with chloranil in n-amyl alcohol solution following the method described in Example I. There was thus obtained the 21-acetate of 6-chloro-$\Delta^{1,4,6}$-pregnatriene-11β,17α,21-triol-3,20-dione. When the same method was applied to the 21-acetate of 6-chloro-$\Delta^{4,6}$-pregnadiene-17α,21-diol-3,11,20-trione, there was produced the 21-acetate of 6-chloro-$\Delta^{1,4,6}$-pregnatriene-17α,21-diol-3,11,20-trione; these trienes were identical to those obtained in accordance with the method of Example I.

Example IV

When in the method of Example I the 21-acetates of 6α-chloro-hydrocortisone and 6α-chloro-cortisone were substituted by those of 6α-chloro-prednisolone and 6α-chloro-prednisone, there were obtained the 21-acetates of 6 - chloro - $\Delta^{1,4,6}$ - pregnatriene - 11β,17α,21 - triol-3,20 - dione and 6-chloro-$\Delta^{1,4,6}$-pregnatriene-17α,21-diol-3,11,20-trione, respectively, identical to the compounds obtained by the method of Example I.

Example V

A solution of 1 g. of the 21-acetate of 6-chloro-$\Delta^{1,4,6}$-pregnatriene-11β,17α,21-triol-3,20-dione in 200 cc. of methanol was cooled to 0° C. and treated, under an atmosphere of nitrogen, with 125 mg. of sodium methoxide. The mixture was kept at 0° C. for 15 minutes and then neutralized with acetic acid and evaporated to dryness under vacuum. The residue was triturated with water and the precipitate was collected, dried and crystallized from acetone-hexane, thus giving the free 6-chloro-$\Delta^{1,4,6}$-pregnatriene-11β,17α,21-triol-3,20-dione.

By the same method there were prepared the free 6-chloro - $\Delta^{1,4,6}$ - pregnatriene - 17α,21 - diol - 3,11,20-trione, 6 - chloro - $\Delta^{4,6}$ - pregnadiene - 11β,17α,21 - triol-3,20 - dione and 6 - chloro - $\Delta^{4,6}$ - pregnadiene - 17α,21-diol-3,11,20-trione.

Example VI

A mixture of 500 mg. of 6-chloro-$\Delta^{1,4,6}$-pregnatriene-17α,21-diol-3,11,20-trione, 5 cc. of pyridine and 0.5 cc. of propionic anhydride was kept at room temperature for 4 hours, poured into ice water and extracted with methylene dichloride. The extract was washed with water, dilute hydrochloric acid, sodium bicarbonate solution and water, dried over anhydrous sodium sulfate, filtered and evaporated to dryness. Crystallization of the residue from acetone-hexane yielded the 21-propionate of 6-chloro-$\Delta^{1,4,6}$-pregnatriene-17α,21-diol-3,11,20-trione.

Similarly, and by reaction with the corresponding acid anhydrides or chlorides having up to 12 carbon atoms, there were prepared the corresponding hydrocarbon carboxylic 21-esters of all of the free alcohols obtained in accordance with Example V. Included were the benzoates, cyclopentylpropionates and other esters previously described.

Example VII

A mixture of 5 g. of the 21-acetate of 6α-chloro-9α-fluoro-hydrocortisone, 7 g. of chloranil and 100 cc. of anhydrous n-amyl alcohol was refluxed for 16 hours, cooled, diluted with 200 cc. of ether and successively washed with water, 5% sodium carbonate solution and water, dried and evaporated to dryness under reduced pressure. The residue was purified by chromatography, thus giving the 21-acetate of 6-chloro-9α-fluoro-$\Delta^{1,4,6}$-pregnatriene-11β, 17α,21-triol-3,20-dione.

Similarly, the reaction of the 21-acetates of the corresponding 6α - chloro - 9α - halo - $\Delta^4$ - pregnene-17α,21-diol-3,20-diones oxygenated at C-11 produced the following compounds: the acetates of 6-chloro-9α-bromo- and 6,9α - dichloro - $\Delta^{1,4,6}$ - pregnatriene - 11β,17α,21-triol-3,20-dione; of 6-chloro-9α-fluoro-, of 6-chloro-9α-bromo and of 6,9α-dichloro-$\Delta^{1,4,6}$-pregnatriene-17α,21-diol-3,11,20-trione.

Example VIII

A mixture of 5 g. of the 21-acetate of 6α-chloro-9α-fluoro-hydrocortisone, 4 g. of chloranil and 100 cc. of xylene was refluxed for 12 hours and then the reaction product was isolated by the method described in the previous example, to give the 21-acetate of 6-chloro-9α-fluoro-$\Delta^{4,6}$-pregnadiene-11β,17α21-triol-3,20-dione.

Similarly, the 21-acetates of the corresponding 6α-chloro-9α-halo-$\Delta^4$-pregnene-17α,21-diol-3,20-diones oxygenated at C–11 were converted into the 21-acetates of 6 - chloro - 9α - bromo - $\Delta^{4,6}$ - pregnadiene - 11β,17α,21-triol - 3,20 - dione, of 6,9α - dichloro - $\Delta^{4,6}$ - pregnadiene-11β,17α,21 - triol - 3,20 - dione, of 6 - chloro - 9α-fluoro-$\Delta^{4,6}$-pregnadiene-17α,21-diol-3,11,20-trione, of 6-chloro-9α - bromo - $\Delta^{4,6}$ - pregnadiene - 17α,21 - diol - 3,11,20-trione and of 6,9α - dichloro - $\Delta^{4,6}$-pregnadiene-17α,21-diol-3,11,20-trione.

1 g. of the 21-acetate of 6-chloro-9α-fluoro-$\Delta^{4,6}$-pregnadiene-11β,17α,21-triol-3,20-dione was mixed with 50 cc. of anhydrous t-butanol, 300 mg. of selenium dioxide and 0.1 cc. of pyridine and the mixture was refluxed for 70 hours under an atmosphere of nitrogen. After cooling, the mixture was diluted with ethyl acetate and filtered through celite, washing the filter with ethyl acetate. The combined filtrate and washings was evaporated to dryness under reduced pressure and the residue was triturated with water. The precipitate was collected by filtration, washed with water, dried and chromatographed, thus producing the 21-acetate of 6-chloro-9α-fluoro-Δ¹,⁴,⁶-pregnatriene-11β,17α,21-triol-3,20-dione.

Similarly, the treatment with selenium dioxide, as described above, of the other 21-acetates of 6-chloro-9α-halo-Δ⁴,⁶-pregnadiene-17α,21-diol-3,20-diones oxygenated at C-11, furnished the 21-acetates of the corresponding 6-chloro-9α-halo-Δ¹,⁴,⁶-pregnatriene - 17α,21 - diol - 3,20-dione oxygenated at C-11, identical to the ones produced by the method of Example VII.

*Example IX*

A solution of 1 g. of the 21-acetate of 6-chloro-9α-fluoro-Δ⁴,⁶-pregnadiene-11β,17α,21-triol - 3,20 - dione, obtained by the method of the previous example, in n-amyl alcohol was treated with chloranil, under the conditions described for this reaction in Example VII, to produce the 21-acetate of 6-chloro-9α-fluoro-Δ¹,⁴,⁶-pregnatriene-11β,17α,21-triol-3,20-dione.

Similarly, the 21-acetates of the other 6-chloro-9α-halo-Δ⁴,⁶-pregnadiene-17α,21-diol - 3,20 - diones oxygenated at C-11, mentioned in the second paragraph of the previous example, were converted into the 21-acetates of the corresponding 6 - chloro-9α-halo-Δ¹,⁴,⁶-pregnatriene-17α,21-diol-3,20-diones oxygenated at C-11, which were identical to the compounds obtained in accordance with the method of Example VII.

*Example X*

When in the method of Example VII the 21-acetate of a 6α-chloro-9α-halo-Δ⁴-pregnene - 17α,21 - diol-3,20-dione oxygenated at C-11 was substituted by the 21-acetate of a 6α-chloro - 9α - halo-Δ¹,⁴-pregnadiene-17α,21-diol-3,20-dione oxygenated at C-11, there were obtained the 21-acetates of the corresponding 6-chloro-9α-halo-Δ¹,⁴,⁶-pregnatriene-17α,21-diol-3,20-diones oxygenated at C-11, identical to the compounds obtained in accordance with the method of Example VII.

*Example XI*

A solution of 1 g. of the 21-acetate of 6-chloro-9α-fluoro-Δ¹,⁴,⁶-pregnatriene - 11β,17α,21 - triol-3,20-dione in 200 cc. of methanol was cooled and mixed with 125 mg. of sodium methoxide, under an atmosphere of nitrogen and taking care that the temperature of the mixture did not rise over 0° C. After 15 minutes at this temperature the mixture was neutralized with acetic acid and evaporated to dryness under vacuum. The residue was triturated with water and the precipitate was collected and recrystallized from acetone-hexane, thus yielding the free 6-chloro-9α-fluoro-Δ¹,⁴,⁶-pregnatriene - 11β,17α,21 - triol-3,20-dione.

Similarly, the 21-acetates of the other new 6-chloro-9α-halo dienes and trienes of Examples VII to X were saponified to the corresponding free alcohols.

*Example XII*

500 mg. of 6-chloro-9α-fluoro-Δ¹,⁴,⁶-pregnatriene-11β,17α,21-triol-3,20-dione was dissolved in 5 cc. of pyridine, mixed with 0.5 cc. of propionic anhydride and kept standing at room temperature for 4 hours. The mixture was then poured into ice water and extracted with methylene dichloride. The extract was washed with water, dilute hydrochloric acid, sodium bicarbonate solution and water, dried and evaporated to dryness. Recrystallization of the residue from acetone-hexane furnished the 21-propionate of 6-chloro-9α-fluoro-Δ¹,⁴,⁶-pregnatriene-11β,17α,21-triol-3,20-dione.

Similarly, by reaction with the corresponding acid anhydride or chloride having up to 12 carbon atoms, there were prepared the corresponding hydrocarbon carboxylic 21-esters of the other 6-chloro-9α-halo dienes and trienes in accordance with Example XI. Included were the benzoates, cyclopentylpropionates and other esters previously described.

We claim:
1. A compound of the following formula:

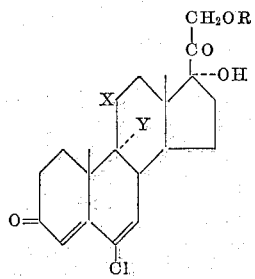

wherein X is selected from the group consisting of =O and $$\diagdown \overset{OH}{\underset{H}{\diagup}}$$

Y is selected from the group consisting of hydrogen, fluoro, chloro and bromo, and R is selected from the group consisting of hydrogen and to a hydrocarbon carboxylic ester group of less than 12 carbon atoms.

2. 6-chloro - Δ⁴,⁶ - pregnadiene - 17α,21 - diol - 3,11,20-trione.

3. The 21-hydrocarbon carboxylic esters of less than 12 carbon atoms of 6-chloro-Δ⁴,⁶-pregnadiene-17α,21-diol-3,11,20-trione.

4. 6,9α - dichloro-Δ⁴,⁶-pregnadiene - 17α,21 - diol-3,11,20-trione.

5. The 21-hydrocarbon carboxylic esters of less than 12 carbon atoms of 6,9α-dichloro-Δ⁴,⁶-pregnadiene-17α,21-diol-3,11,20-trione.

6. 6 - chloro - 9α - fluoro-Δ⁴,⁶-pregnadiene-17α,21-diol-3,11,20-trione

7. The 21-hydrocarbon carboxylic esters of less than 12 carbon atoms of 6-chloro-9α-fluoro-Δ⁴,⁶-pregnadiene-17α,21-diol-3,11,20-trione.

8. 6-chloro-9α-bromo-Δ⁴,⁶-pregnadiene - 17α,21 - diol-3,11,20-trione.

9. The 21-hydrocarbon carboxylic esters of less than 12 carbon atoms of 6-chloro-9α-bromo-Δ⁴,⁶-pregnadiene-17α,21-diol-3,11,20-trione.

10. 6-chloro-Δ⁴,⁶-pregnadiene - 11β,17α,21 - triol-3,20-dione.

11. The 21-hydrocarbon carboxylic esters of less than 12 carbon atoms of 6-chloro-Δ⁴,⁶-pregnadiene-11β,17α,21-triol-3,20-dione.

12. 6,9α-dichloro-Δ⁴,⁶-pregnadiene - 11β,17α,21 - triol-3,20-dione.

13. The 21-hydrocarbon carboxylic esters of less than 12 carbon atoms of 6,9α-dichloro-Δ⁴,⁶-pregnadiene-11β,17α,21-triol-3,20-dione.

14. 6-chloro - 9α - fluoro-Δ⁴,⁶-pregnadiene-11β,17α,21-triol-3,20-dione.

15. The 21-hydrocarbon carboxylic esters of less than 12 carbon atoms of 6-chloro-9α-fluoro-Δ⁴,⁶-pregnadiene-11β,17α,21-triol-3,20-dione.

16. 6-chloro - 9α - bromo-Δ⁴,⁶-pregnadiene-11β,17α,21-triol-3,20-dione.

17. The 21-hydrocarbon carboxylic esters of less than 12 carbon atoms of 6-chloro-9α-bromo-Δ⁴,⁶-pregnadiene-11β,17α,21-triol-3,20-dione.

18. A compound of the following formula:

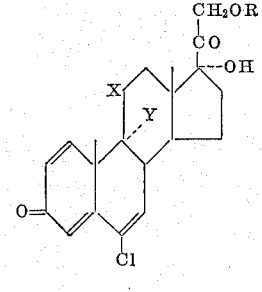

wherein X is selected from the group consisting of =O and

Y is selected from the group consisting of hydrogen, fluoro, chloro and bromo, and R is selected from the group consisting of hydrogen and a hydrocarbon carboxylic ester group of less than 12 carbon atoms.

19. 6-chloro-$\Delta^{1,4,6}$-pregnatriene - 17α,21 - diol-3,11,20-trione

20. The 21-hydrocarbon carboxylic esters of less than 12 carbon atoms of 6-chloro-$\Delta^{1,4,6}$-pregnatriene-17α,21-diol-3,11,20-trione.

21. 6,9α - dichloro - $\Delta^{1,4,6}$ - pregnatriene-17α,21-diol-3,11,20-trione 22. The 21-hydrocarbon carboxylic esters of less than 12 carbon atoms of 6,9α-$\Delta^{1,4,6}$-pregnatriene-17α,21-diol-3,11,20-trione.

23. 6 - chloro-9α-fluoro-$\Delta^{1,4,6}$-pregnatriene-17α,21-diol-3,11,20-trione.

24. The 21-hydrocarbon carboxylic esters of less than 12 carbon atoms of 6-chloro-9α-fluoro-$\Delta^{1,4,6}$-pregnatriene-17α,21-diol-3,11,20-trione.

25. 6 - chloro-9α-bromo-$\Delta^{1,4,6}$-pregnatriene-17α,21-diol-3,11,20-trione.

26. The 21-hydocarbon carboxylic esters of less than 12 carbon atoms of 6-chloro-9α-bromo-$\Delta^{1,4,6}$-pregnatriene-17α,21-diol-3,11,20-trione.

27. 6 - chloro-$\Delta^{1,4,6}$-pregnatriene-11β,17α,21-triol-3,20-dione.

28. The 21-hydrocarbon carboxylic esters of less than 12 carbon atoms of 6-chloro-$\Delta^{1,4,6}$-pregnatriene-11β,17α,21-triol-3,20-dione.

29. 6,9α - dichloro-$\Delta^{1,4,6}$-pregnatriene-11β,17α,21-triol-3,20-dione.

30. The 21-hydrocarbon carboxylic esters of less than 12 carbon atoms of 6,9α-dichloro-$\Delta^{1,4,6}$-pregnatriene-11β,17α,21-triol-3,20-dione.

31. 6 - chloro-9α-fluoro-$\Delta^{1,4,6}$-pregnatriene-11β,17α,21-triol-3,20-dione.

32. The 21-hydrocarbon carboxylic esters of less than 12 carbon atoms of 6-chloro-9α-fluoro-$\Delta^{1,4,6}$-pregnatriene-11β,17α,21-triol-3,20-dione.

33. 6 - chloro-9α-bromo-$\Delta^{1,4,6}$-pregnatriene-11β,17α,21-triol-3,20-dione.

34. The 21-hydrocarbon carboxylic esters of less than 12 carbon atoms of 6-chloro-9α-bromo-$\Delta^{1,4,6}$-pregnatriene-11β,17α,21-triol-3,20-dione.

35. Compounds of the general formula:

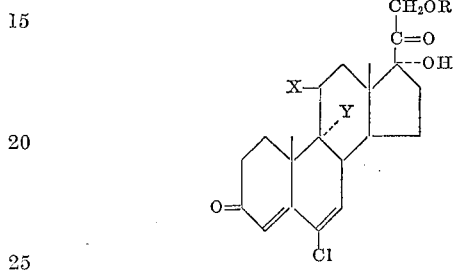

and the $\Delta^{1(2)}$-dehydro derivatives thereof, wherein X represents a member selected from the group consisting of β-hydroxyl and keto groups, Y represents a member selected from the group consisting of hydrogen and fluorine atoms, and R represents a member selected from the group consisting of a hydrogen atom and a hydrocarbon carboxylic ester group having from two to eight carbon atoms.

No references cited.

LEWIS GOTTS, *Primary Examiner.*

WALTER A. MONDANCE, B. E. LANHAM, IRVING MARCUS, *Examiners.*